United States Patent
Maruyama et al.

(10) Patent No.: US 6,792,596 B2
(45) Date of Patent: Sep. 14, 2004

(54) METHOD AND SYSTEM FOR PROTECTING RESOURCE CENTRAL PROGRAMS

(75) Inventors: Hiroshi Maruyama, Tokyo-to (JP); Hisashi Kojima, Ushiku (JP)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 09/816,954

(22) Filed: Mar. 23, 2001

(65) Prior Publication Data

US 2001/0025370 A1 Sep. 27, 2001

(30) Foreign Application Priority Data

Mar. 23, 2000 (JP) ........................................ 2000-082556

(51) Int. Cl.[7] .............................................. G06F 9/44
(52) U.S. Cl. ...................................................... 717/110
(58) Field of Search ................................ 717/165, 166, 717/106–118

(56) References Cited

U.S. PATENT DOCUMENTS

| | | | | |
|---|---|---|---|---|
| 5,418,964 A | * | 5/1995 | Conner et al. | 719/316 |
| 6,260,187 B1 | * | 7/2001 | Cirne | 717/110 |
| 6,339,829 B1 | * | 1/2002 | Beadle et al. | 713/201 |
| 6,470,494 B1 | * | 10/2002 | Chan et al. | 717/166 |
| 6,526,571 B1 | * | 2/2003 | Aizikowitz et al. | 717/154 |

FOREIGN PATENT DOCUMENTS

| | | | | |
|---|---|---|---|---|
| JP | 056736 | 3/1995 | | G06F/9/44 |
| JP | 187450 | 7/1998 | | G06F/9/44 |

* cited by examiner

Primary Examiner—Wei Zhen
Assistant Examiner—Chuck Kendall
(74) Attorney, Agent, or Firm—A. Bruce Clay; Yee & Associates, P.C.

(57) ABSTRACT

It is one object of the present invention to edit a Java program by effectively utilizing the access control using a name scope, so that a program that controls a resource and is to be protected can be prevented from being called by a malevolent program. According to the present invention, a Java program development method comprises:

a package name replacement step (101) of replacing, with a single package name, package names of packages to which classes that constitute a program belong;

a name scope changing step (102) of changing, to package scopes, name scopes of internal fields in the classes that are not to be referred to by sources outside the application program; and a digital signing step (105) of digitally signing the program obtained through the package name replacement and the name scope changing.

17 Claims, 8 Drawing Sheets

FIG. 4

Class com.ibm.p1_X

```
package com.ibm.p1;
public class X implements java.awt.event.ActionListener { public static void e1() {
    com.ibm.p2.Y.e2();    // Call package com.ibm.p2
  }

/**
   * Method called by system class
   */
  public void actionPerformed(java.awt.event.ActionEvent e) {
    // perform action
  }
}
```

FIG. 5

Class com.ibm.p2.Y

```
package com.ibm.p2;

public class Y { public static void e2() {
    com.ibm.p3.X.e3();    // Call package com.ibm.p3
  }

Class com.ibm.p3.X

```
package com.ibm.p3;

public class X implements java.awt.event.ActionListener {  //Overlapped class name public static void e3() {
    com.ibm.p1.X.e1();    // Call package com.ibm.p1
  }

```
Class com.ibm.p0.FOO_com_ibm_p1_X package com.ibm.p0;

class Foo_com_ibm_p1_X implements java.awt.event.ActionListener {  // Changed to package scope static void e1() {      // Changed to package scope
    Y.e2();               // Changed to calling of the same package
  }

/**
   * Method called by system class . . . . unchanged
   */
  public void actionPerformed(java.awt.event.ActionEvent e) {
    // perform action
  }
}
```

FIG. 8

Class com.ibm.p0.Y

```
package com.ibm.p0;

class Y {    // Changed to package scope static void e2() {    // Changed to package scope
    Foo_com_ibm_p3_X.e3();    // Changed to calling of the same package
  }

Class com.ibm.p0.FOO_com_ibm_p3_X

```
package com.ibm.p0;

class Foo_com_ibm_p3_X implements java.awt.event.ActionListener {  // Changed to package scope static void e3() {  // Changed to package scope
    Foo_com_ibm_p1_X.e1();   // Changed to the same package
  }
}
```

METHOD AND SYSTEM FOR PROTECTING RESOURCE CENTRAL PROGRAMS

DETAILED DESCRIPTION OF THE INVENTION

The present invention relates to a program editing method for protecting a program that controls a resource and for preventing the program from being called by a malevolent program.

BACKGROUND ART

Java has a unique programming environment that permits a plurality of programs to be loaded into and executed by a single Java VM. Therefore, a mechanism is required to prevent a program that controls certain resources and that must be protected (hereinafter referred to as a program A) from being called by a malevolent program (hereinafter referred to as a program M). The program A for which protection is required is, for example, a system class group (e.g., java.io.FileInputStream) for accessing a local file, a class for managing privacy information relating to a user, or a class that has the authority to call a system class when a signature is provided for the program A.

Generally, the following two methods are employed as means for hiding a program A from a program M during its execution. The first method is a method for separating a class loader when the program A and the program M are separate applications. All Java code is constituted by a class file for each class unit, and when a class is requested, it is dynamically loaded by the class loader. The class loader examines the principle of the pertinent class to determine whether or not it should be loaded.

The second method is a method by which a stack inspection is performed to test the principle of the program M if the program A is a system class. However, according to the method for separating class loaders, if the program A and the program M are placed on the same web page (in the same directory), the program M can employ the class loader provided for the program A, so that any limitations imposed on access are nullified. According to the method for conducting a stack inspection, a stack inspection can not be performed for a program A having a signature that provides the authority necessary for an access, or a class that is loaded from a local file.

The means (static access control) for protecting a program A before the execution is, for example, a method for employing a name scope to limit an access. The name scope is what is declared by a field or a method to define the visibility of a field or a method. In accordance with the declared name, references (accesses) by another program can be controlled. For example, the "private" scope can not be directly referred to by other programs, while the "public" scope can. Further, the "package" scope can not be referred to by programs outside the package of the field and the method for which the package scope is declared.

When the name scope is to be employed, it is guaranteed that a field or a method that is declared private will not be directly accessed by another program. Therefore, when a program A is declared to be private, accesses by the program M can be prevented. However, so long as a program consists of a plurality of classes and interaction among these classes is present, not all the fields and methods can be declared private, and the scope of some of the fields and methods must be the package scope or a higher scope (protected or public).

In accordance with Java programs up to JDK 1.2.1, an arbitrary program M can freely declare its package as constituting the package scope (it should be noted that a package name should fall within the effective name range for the package). Therefore, a so-called "Package Joining Attack" occurs when a program M declares its package using the same name as is used by a program A, and joins the package of the program A. That is, while the names of the methods and fields in different packages can be prevented from erroneously colliding with each other, for security, it can not be used as an access control mechanism.

Since the One-Package-One-Principal Policy, according to which only one signatory is allocated for one package is employed in the JDK 1.2.2, a program M without a signature can not join the same package as a program A which has a signature. Therefore, in the signed program, the field or the method that is declared as a package is not accessed by a malevolent program. Thus, for security, the package scope can function to limit access.

PROBLEMS TO BE SOLVED BY THE INVENTION

As is described above, a static access control means that employs a name scope can effectively function as a Java mechanism for preventing a program A, which controls a resource and which must be protected, from being called by a malevolent program M. However, for security, this mechanism only works when the program A is declared to be private, or when the signed program A is declared to be a package. Thus, security is still not provided for the class, the fields or the methods with the protected scope or the public scope.

Most non-trivial Java programs consist of a plurality of packages, and for interaction among the packages, some of the classes, the fields or the methods must be declared as being public. Therefore, in such a program, access control using the private scope or the package scope can not be effectively utilized.

It is, therefore, one object of the present invention to edit a Java program by effectively utilizing the access control using a name scope, so that a program that controls a resource and is to be protected can be prevented from being called by a malevolent program.

It is another object of the present invention to edit a program written in a programming language that implements an access control process based on the same concept as the package scope of Java, so that a program that controls a resource and is to be protected can be prevented from being called by a malevolent program.

SUMMARY OF THE INVENTION

To achieve the above objects, in accordance with the present invention a method is provided for editing a program written in an object oriented programming language that satisfies two conditions, a condition according to which a program includes the concept of a package that controls visibility of local names, and a condition according to which a program includes an access control system for obtaining an access authority based on "principal (identity of person or entity that developed or deployed the program)" information provided to specify the references of an access requester, the method comprising: a package name replacement step of replacing package names allocated for a plurality of classes that constitute an application program having a single package name; a data attribute change step of changing an attribute of internal fields of the classes that are not referred to by a source outside the application program, so as to accept an access request for a reference from the same package; and an access authority provision step of providing an access authority that is based on the principal information for the application program that has been processed at the package name replacement step and the data attribute change step. With this arrangement, except for a method or a variable among the system classes that is externally referred to, the fields in the package can not be accessed by a program without the same access authority as the application program. Since the one-package-one-principal policy is employed, the fields can not be accessed by a requestor outside the application program, and external illegal accesses can be prevented.

The program editing method further comprises: a class name changing step of changing the class name of a specific class of the application program when as a result of the package name replacement step the specific class has a name collision. This arrangement is preferable because single packaging of the application program can be performed even when a class having the same class name is present in a different package.

At the class name changing step, in order to change the class name of the specific class, a new class name is generated by using a character string that is employed for the package name of the package, before the package is changed at the package name replacement step, to which the specific class belongs. This arrangement is preferable because to avoid a collision a new class name can be mechanically generated. A method for replacing dots in a package name with underscores (underlining) and using the underscores can be employed to generate a new class name using the character string employed for the package name. Further, in order to completely avoid a collision, a new class name may be provided by adding a character string that does not yet appear in any of the class names.

The program editing method further can include a step of: mechanically changing class names in the application to unique class names that do mutually not overlap without detecting whether one class name overlaps another as a result of a change in the package name. A method for allocating a serial number to each class can be employed to change the class names.

According to the present invention, the following single packaging system can be provided for the single packaging of a Java program. Specifically, a single packaging system comprises: input means for entering a Java program consisting of a plurality of classes; package name replacement means for replacing, with a single package name, package names of packages to which the classes of the Java program entered by the input means belong; name scope changing means for changing, to package scopes, name scopes of internal fields in the classes that are not to be referred to by sources outside the Java program; and output means for outputting the obtained Java program through the package name replacement and the name scope change. With this arrangement, an external access to the fields of the application program that is to be referred to only by the application program is not accepted. Therefore, when the program is digitally signed and the one-package-one-principal policy is employed, an access by a source outside the program is not accepted for the message and the variable described above, and an illegal external access can be prevented.

Therefore, the single packaging system further comprises: digital signing means for digitally signing the program obtained through the package name replacement and the name scope change.

The single packaging system can further include: name list preparation means for preparing a name list for the class names and the name scopes of the internal fields in the classes; name collision avoiding means for examining the name list, prepared by the name list preparation means, to find class names that are the same as the result of the package name replacement performed by the package name replacement means, and for changing the same class names in the name list in order to avoid the overlapping of the class names, and the name scope changing means refers to the name list to change the name scopes, and replaces class names with class names to avoid collision. This arrangement is preferable because the program can be formed into a single package even when a class having the same class name exists in a different package in the program before being single packaged.

According to the present invention, a Java program development system comprises: package name replacement means for replacing, with a single package name, package names of packages to which classes that constitute the program belong; name scope changing means for changing, to package scopes, name scopes of internal fields in the classes that are not to be referred to by sources outside the application program; and digital signing means for digitally signing the program obtained through the package name replacement and the name scope changing. This arrangement is preferable because the program that is prepared at the final step of the Java program development can be formed into a single package and digitally signed.

The Java program development system further comprises: name list preparation means for preparing a name list for the class names and the name scopes of the internal fields in the classes; name collision avoiding means for examining the name list, prepared by the name list preparation means, to find class names that are the same as the result of the package name replacement performed by the package name replacement means, and for changing the same class names in the name list in order to avoid the overlapping of class names; and the name scope changing means refers to the name list to change the name scopes, and replaces class names with class names to avoid collision. This arrangement is preferable because the program can be formed into a single package even when a class having the same class name exists in a different package in the program before being single packaged.

According to the present invention, the following principal information addition system for adding principal information to a program can be provided. A principal information addition system comprises: input means for entering an application program that has as a concept a package that controls visibility of local names, and that consists of one or more classes that belong to predetermined packages; package name replacement means, for replacing, with a single package name, package names of packages to which the classes of the application program entered by the input means belong; data attribute change means, for changing an attribute of internal fields of the classes that are not referred to by sources outside of the application program, so as to permit an access for a reference in the same package; and principal information addition means, for adding principal information for specifying a reference of an access requesting principal to the application program obtained through the package name replacement and the data attribute change, and for controlling access based on the principal information; and output means, for outputting the application program including the principal information. This arrangement is preferable because the application program can be formed into a single package at the same time, when the principal information is added to the program.

A digital signature can be employed for the principal information to be added by the principal information addition system. This is preferable because the present invention can be applied for a conventional access control system that obtains the access authority based on a digital signature.

According to the present invention, an editing program, which permits a computer to edit the program that is written in an object oriented programming language, based on a concept of a package that controls visibility of local names comprises: a package name replacement process, for replacing, with a single package name, package names of packages to which classes that constitute an application program belong; and a data attribute change process, for changing an attribute of internal fields of the classes that are not referred to by sources outside the application program, so as to accept an access for a reference in the same package. The editing program further comprises: a class name changing process for changing the class name of a specific class of the application program when as a result of the package name replacement process the specific class has the same class name as another class. This arrangement is preferable because single packaging of the application program can be performed even when a class having the same class name is present in a different package.

According to the present invention, a storage medium is provided on which input means of the computer stores a computer-readable program, which permits the computer to perform: a process for replacing, with a single package name, package names of packages to which classes that constitute a Java application program belong; and a process for changing, to package scopes, name scopes of internal fields in the classes that are not to be referred to by sources outside the Java application program. This arrangement is preferable because all the computers that have installed this computer-readable program can perform single packaging for the Java program.

For the storage medium, the computer-readable program permits the computer to further perform: a class name changing process for changing the class name of a specific class of the application program when as a result of the package name replacement process the specific class has the same class name as another class.

According to the present invention, a program transmission system comprises: storage means for storing a program that permits a computer to perform a process for replacing, with a single package name, package names of packages to which classes that constitute a program belong, and a process for changing, to package scopes, name scopes of internal fields in the classes that are not to be referred to by sources outside the application program; and transmission means for reading the program from the storage means and transmitting the program. This arrangement is preferable because all the computers that have downloaded this program can perform single packaging of the Java program.

For the program transmission apparatus, the program permits the computer to further perform: a class name changing process for changing the class name of a specific class of the application program when as a result of the package name replacement process the specific class has the same class name as another class.

Preferred Embodiment

The present invention will now be described in detail during the course of an explanation of the embodiment, given while referring to the accompanying drawings.

According to the invention, the single packaging of a program can be performed for an object-oriented programming language that satisfies the following three conditions. Specifically, these conditions are that a program has the concept of a package, that a program includes an access control system for obtaining an access authority based on information for specifying the principal of the program and that a program observes the one-package-one-principal policy. A package is a concept for defining the visibility for another program, and a field that is declared as a package can not be referred to by a package other than one wherein the pertinent field is present. It should be noted that, the package system required here refers to an abstract functionality of controlling access, and does not refer to any specific format or a programming language. Therefore, so long as the package substantially has a function for defining the visibility for another program, any format can be employed.

A digital signature based on a public key encryption system, can be employed as example information for specifying the principal of the program that is requesting access permission. The preparation of an access control system for obtaining access authority based on a digital signature satisfies the above described conditions.

Further, the one-package-one-principal policy means that in an access control system using a digital signature one package is limited to only one signature. That is, if a program is signed, the request of another program without the same digital signature to join (access) the same package is rejected.

Java 1.2.2 is a programming language that satisfies the above conditions. In this embodiment, the present invention is applied for Java 1.2.2. Hereinafter, "package" represents the package scope defined in Java. It should be noted that the present invention can also be applied for all other programming languages that substantially satisfy the above conditions. FIG. 1 is a flowchart for explaining a method used for the single packaging of a program according to the embodiment.

In FIG. 1, in this embodiment, all the package names in a program to be formed into a single package are replaced with a single package name (step 101). Assume that a predetermined application program A has been developed as a plurality (k) of classes, and that these classes belong to packages P1, P2, . . . and Pk. In this case, these package names are replaced with a single package name P0.

The name scopes of all the "localizable" names in the program are replaced with package scopes (step 102). A name is localizable if and only if a field having a pertinent name is not referred to by sources outside the program. In program A, when the classes of the packages P1, P2, . . . and Pk are prepared, several public and protected names are present in each package for interaction among the packages or with other programs (e.g., a system class). These "public" and "protected" names are called external names. Among these names, the names that are not referred to by sources outside program A are all replaced by package scopes. The processes at steps 101 and 102 may be performed in an arbitrary order, or may be performed in parallel.

A check is performed to determine whether a collision of class names will occur due to the replacement of the package names (step 103). When a collision occurs, the pertinent class names are changed to avoid the collision (step 104). A collision of class names means that class names that were originally provided for individual packages overlap due to the replacement of the package names. For example, assume that classes having a name C (e.g., Pi.C and Pj.C) are present in the two packages Pi and Pj before the single-packaging of a program. In this case, when the same package name is used, the two class names will collide (if the package name is P0, the class names of the two packages are P0.C). Therefore, the class names are changed to avoid the collision.

Various methods for changing a class name can be employed, but in this embodiment, the following method, which can be effected by using a mechanical process, is employed. First, one character (or a character string) that does not appear in any of the class names in program A is selected, and is defined as a It is obvious that a can be selected by a finite computation. The following class names are assigned for the two classes Pi.C and Pj.C. In the explanation below, "+" represents the concatenation of character strings, and replace_dot(b) represents a character string obtained by replacing a dot (.) in a character string b with an underline (_).

Class C (Pi.C) in the package Pi
    class name a+"_"+replace_dot(Pi)+"_"+C

Class C (Pj.C) in the package Pj
    class name a+"_"+replace_dot(Pj)+"_"+C

In this manner, a character string that was used in the original package name and a character string that does not appear in any class name is allocated to obtain a new class name, so that the class names differ from each other and a class name collision can be avoided.

The class name change method described above is only an example. In the above embodiment, the dot in the original package name is changed to an underline; however, any other rule may be used for changing the class name. Further, while a character string that is used in the original package name is employed, a serial number may be employed to generate a class name. In addition, to prevent class name collisions due to the replacement of the package names, in addition to the above method for detecting class names that collide and for changing these class names, class names that do not overlap may be generated by using serial numbers and may be provided for all the classes in the program. In this case, the determination process at step 103 is not required, and the class names of all the classes are changed at step 104.

Finally, a digital signature is provided for the program which has a single package name (step 105). The digital signing process is a separate step from single-packaging a program, but is necessary in order for this embodiment to be effective as security means. That is, the single packaging of a program alone can not prevent a package joining attack in which another program joins the pertinent program by declaring a package having the same name as the program. With single packaging, the external names that are used only for communication among the packages in the same program are replaced by the package scopes so as to prevent the external names from being referred to by external sources. Thus, after the program is digitally signed, and a package joining attack is prevented based on the one-package-one-principal policy. As a result, external accesses can be rejected for the external names that are used only as mutual references among the packages in the same program.

FIG. 2 is a diagram for explaining the arrangement of a single packaging system. This system is provided by integrating it in the JDK (Java Developers Kit) or as a function of a digital signing system that signs a generated application program.

In FIG. 2, first input means 21 enters a program consisting of a plurality of classes, and the "manifest" of the program. Name list preparation means 22 prepares a name list 24 of all the class names in the input program and the localizable names. Name collision avoiding means 23 rewrites the class names on the name list 24 that is prepared by the name list preparation means 22 in order to avoid collisions. Then, second input means 25 enters the pertinent program again, and name replacement means 26 refers to the name list 24 to replace the localizable names in the program with a package scope. The name replacement means 26 further changes the package names of the individual classes of the program to provide a single package name. Through this name replacement process, the program can be formed into a single package. Subsequently, output means 27 outputs the single-packaged program P0 obtained by using name replacement means 26. Finally, digital signing means 28 signs the output program P0.

These components can be implemented by using a CPU and an internal memory, such as a RAM, and an external memory, such as a hard disk, for a computer in which the JDK and the digital signing system is mounted.

The program single packaging processing according to the embodiment will now be described while referring to FIG. 2.

The system processing in FIG. 2 is composed of the processing for creating the name list 24 and the processing for employing the name list 24 to rewrite a necessary name in a program. In the processing for creating the name list 24, first, the first input means 21 enters a target program consisting of a plurality of classes and the "manifest" of the program. The name list preparation means 22 extracts all the class names in the program and all the localizable names, and prepares the name list 24. Then, the name collision avoiding means 23 examines the name list 24 to find class names that will collide with each other when a single package name is used in common.

The name collision avoiding means 23 then rewrites the detected class names to avoid the collision. As is described above, a new name can be generated by using various methods, such as the method for using a character string that is employed in the original package name and the method for employing a serial number.

The second input means 25 reads the target program again, and the name replacement means 26 examines the name list 24 to replace the localizable names in the program with the package scopes. Then, the name replacement means 26 replaces the package names of the individual classes constituting the program with a single package name. Since the class names registered in the name list 24 have already been rewritten by the name collision avoiding means 23 so that they will not overlap, even when the package names are the same, collisions of class names do not occur. Thereafter, the single-packaged program is output by the output means 27, and is signed by the digital signing means 28.

As is described above, the processing for preparing the name list 24 and the processing for replacing the program name are performed separately because the overall program must be viewed once in order to detect the name scope of the program for which a name replacement is required. Therefore, when a method for changing all the class names, in addition to the name scopes that will collide, is employed, the processing for creating the name list 24 need not be performed, and the first input means 21, the name list preparation means 22 and the name collision avoiding means 23 can be eliminated.

An explanation will now be given for an example of the single packaging of a program.

FIG. 3 is a diagram showing the state wherein the program is formed into a single package in accordance with this embodiment. FIGS. 4 to 6 are diagrams showing the contents of the individual classes of a program before the single-packaging in FIG. 3 is performed, and FIGS. 7 to 9 are diagrams showing the contents of the individual classes that correspond to those in FIGS. 4 to 6 after the single-packaging is performed. The single packaging will now be explained while referring to these drawings.

In the example in FIG. 3, an application program consisting of three classes X, Y and X is formed into a single package. The three classes belong to independent packages com.ibm.p1, com.ibm.p2 and com.ibm.p3.

In FIG. 4, two public methods are defined in the class X (denoted as com.ibm.p1.X in the figure) that belongs to the package com.ibm.p1. One method is a localizable method that calls the package com.ibm.p2, while the other is a method that is called by a system class. Similarly, in FIG. 5, a method that calls the package com.ibm.p3 is present in the class Y (denoted as com.ibm.p2.Y in the figure) that belongs to the package com.ibm.p2, and in FIG. 6, a method that calls the package com.ibm.p1 is present in the class X (in FIG. 6, com.ibm.p3.X) that belongs to the package com.ibm.p3. These methods are public but localizable.

The class names of the class X that belongs to the package com.ibm.p1 and the class X that belongs to the package com.ibm.p3 overlap when the same package name is used in common.

The program single-packaging is performed in the following manner. Assume that a new package name is com.ibm.p0.

As is described above, since the class name of the class X that belongs to the package com.ibm.p1 will collide with the class name of the class X that belongs to the package com.ibm.p3, the class names are changed to avoid the collision. At this time a ="FOO" is employed as a character a that does not appear in any class name. Therefore, the class name of the class X in the package com.ibm.p1 is FOO__com__ibm__p1__X, while the class name of the class X in the package com.ibm.p3 is FOO__com__ibm__p3__X, and the collision can be avoided.

Then, the localizable "public" names are changed to the package scope. In FIG. 7, the public scope that includes the method in FIG. 4 that calls the package com.ibm.p2 is changed to the package scope, and the calling method is changed to the method for calling the class Y in the same package. Since the method that is called by the system class is not an internal method, it is unchanged. Similarly, in FIG. 8, the public scope that includes the method in FIG. 5 that calls the package com.ibm.p3 is changed to the package scope, and in FIG. 9, the public scope that includes the method in FIG. 6 that calls the package com.ibm.p1 is changed to the package scope.

When, in the above described manner, all the localizable names have been changed to the package scopes, and the collision of the class names can be avoided, the single packaging of the program is completed.

In the above example, the source file is formed into a single package. This processing consists only of the replacement of the class names, the field names and the method names, as described above. Therefore, when the same process is employed for a class file that is compiled, only the "Constant Pool" portion has to be changed; the "Byte Code" portion is unchanged. That is, re-compiling is not required. Therefore, the same single packaging can be performed for an application program that includes a library with no source code, which is produced by another company, and almost all the external names can be changed to internal names.

Advantages of the Invention

As is described above, according to the present invention, a Java program can be edited by effectively utilizing access control involving a name scope, so that a program that controls a resource and is to be protected can be prevented from being called by a malevolent program.

Further, according to the present invention, it is possible to edit a program written in a programming language that implements the access control based on the same concept as the package scope of the Java, so that a program that controls a resource and is to be protected can be prevented from being called by a malevolent program.

BRIEF DESCRIPTION OF THE DRAWINGS

FIG. 4 is a diagram showing the contents of a class com.ibm.p1.X in a program before the single-packaging that is performed in FIG. 3.

FIG. 5 is a diagram showing the contents of a class com.ibm.p2.Y in the program before the single-packaging that is performed in FIG. 3.

FIG. 6 is a diagram showing the contents of a class com.ibm.p3.X in the program before the single-packaging that is performed in FIG. 3.

FIG. 7 is a diagram showing the contents of a class com.ibm.p0.FOO__com__ibm__p1__X in the program after the single-packaging that is performed in FIG. 3.

FIG. 8 is a diagram showing the contents of a class com.ibm.p0.Y in the program after the single-packaging that is performed in FIG. 3.

FIG. 9 is a diagram showing the contents of a class com.ibm.p0.FOO__com__ibm__p3__X in the program after the single-packaging that is performed in FIG. 3.

Figure 1:
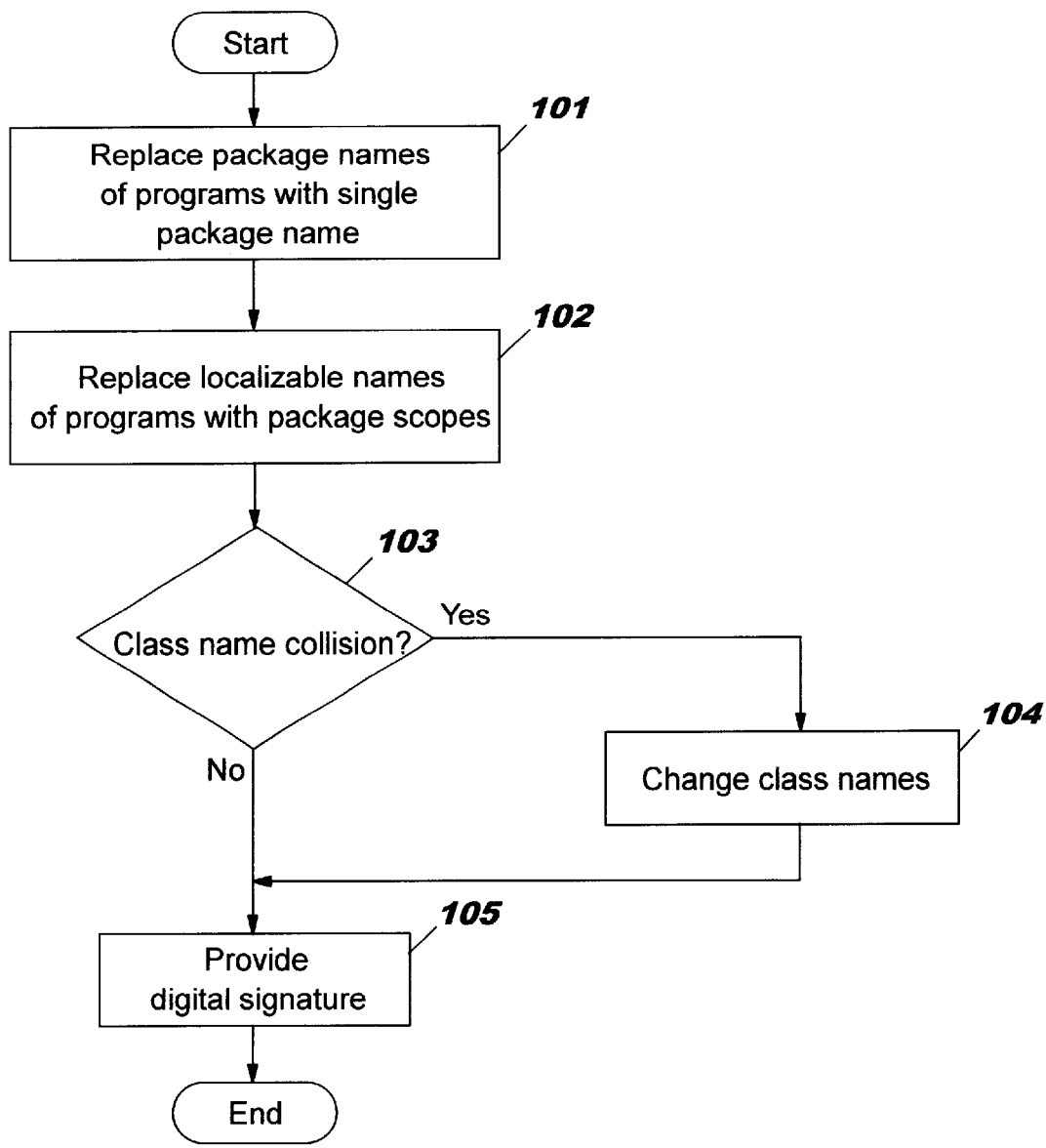
FIG. 1 is a flowchart for explaining a program single-packaging method according to one embodiment of the present invention.
Figure 2:
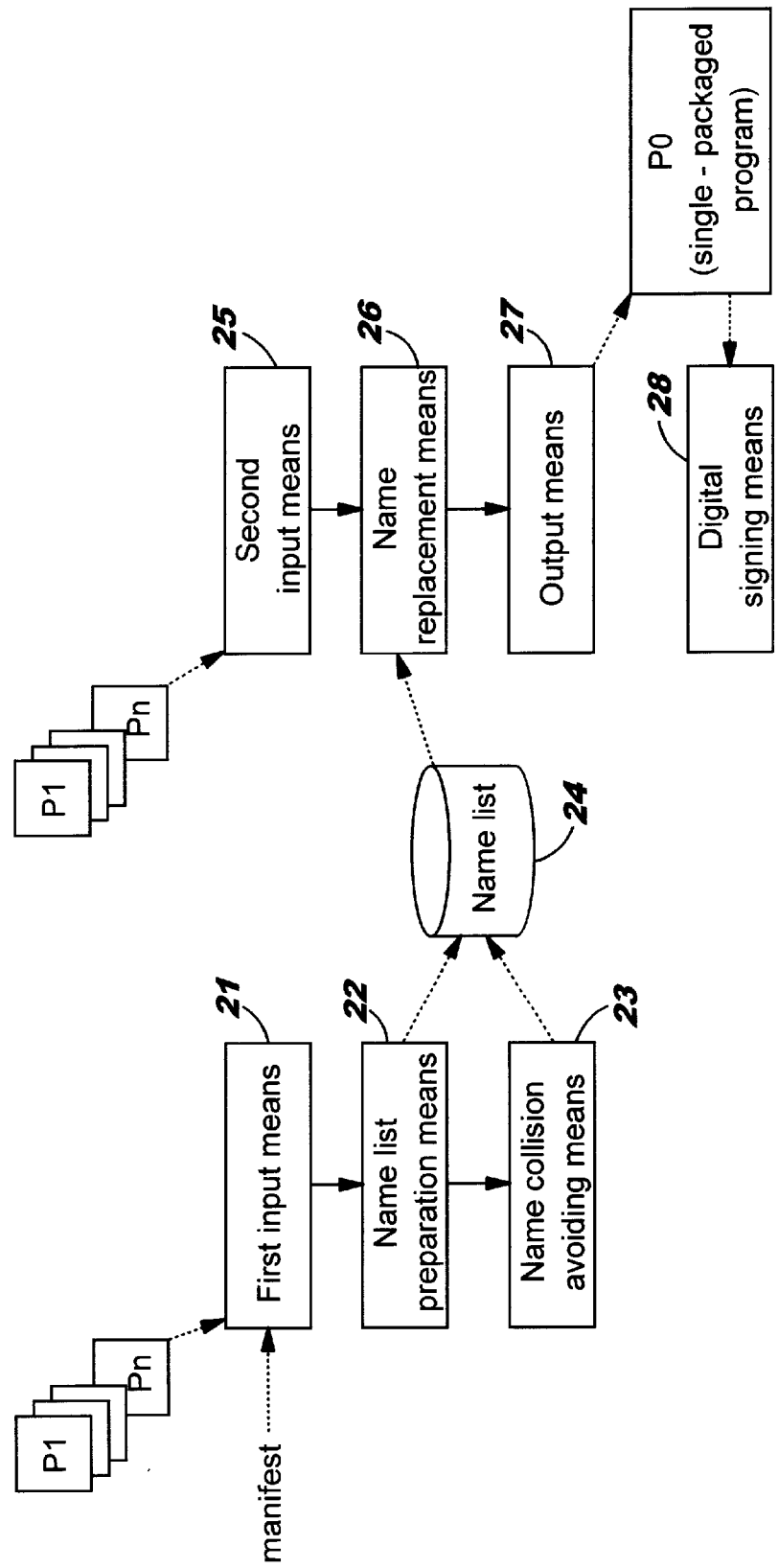
FIG. 2 is a diagram for explaining an example arrangement of a system that performs the program single-packaging processing according to the embodiment.
Figure 3:
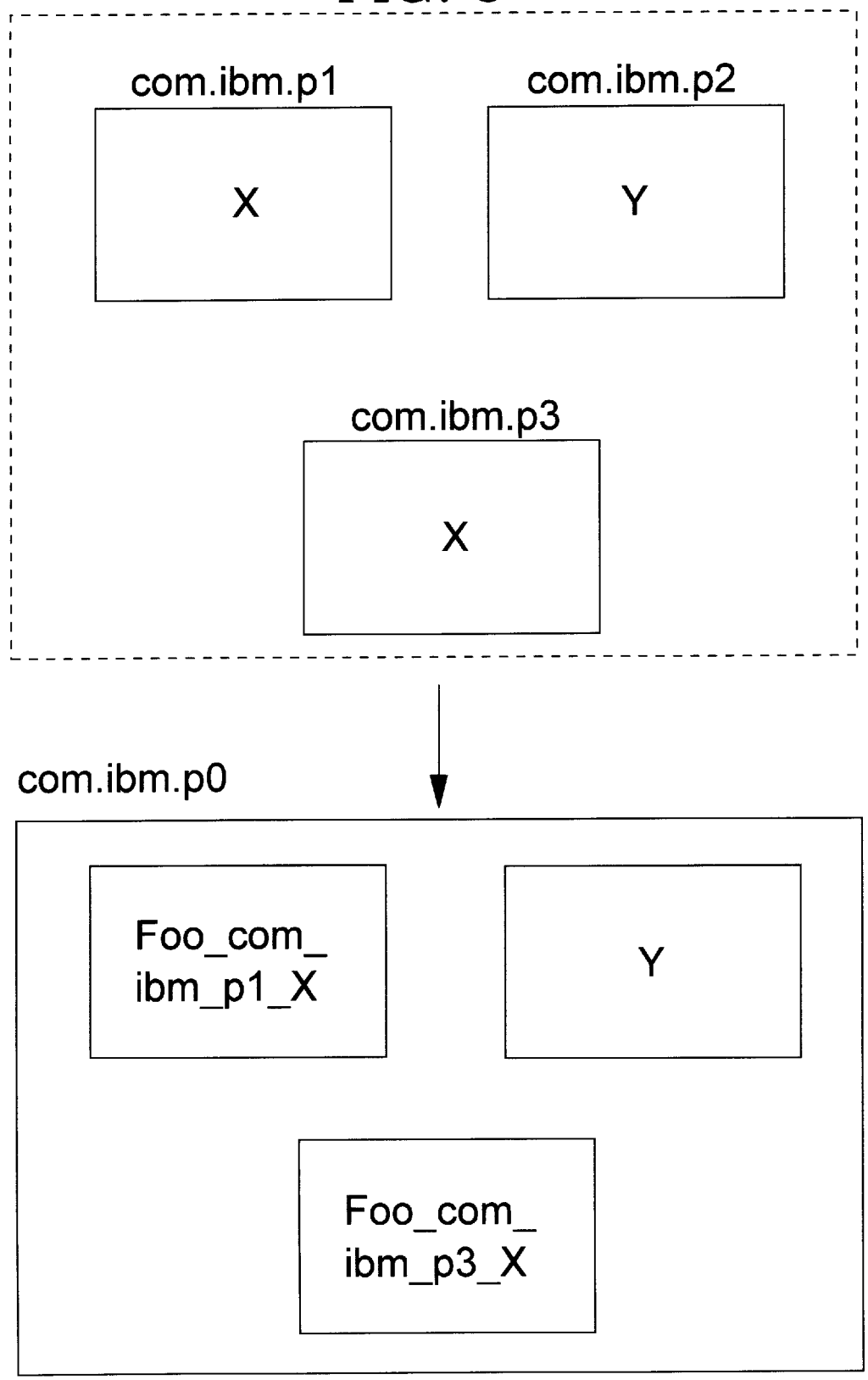
FIG. 3 is a diagram showing the condition according to this embodiment wherein a program is formed into a single package.

What is claimed:

1. A program editing method for editing a program written in an object oriented programming language that satisfies two conditions, a condition according to which a program includes the concept of a package that admits mutual data by referring only to a specific visibility that is designated, and a condition according to which a program includes an access control system for obtaining an access authority based on principal information provided to specify the references of an access requester, said program editing method comprising:

a package name replacement step of replacing package names allocated for a plurality of classes that constitute an application program having a single package name;

a data attribute change step of changing an attribute of internal fields of said classes that are not referred to by a source outside said application program, so as to accept an access request for a reference from the same package; and an access authority provision step of providing an access authority that is based on said principal information for said application program that has been processed at said package name replacement step and said data attribute change step.

2. The program editing method according to claim 1, further comprising:

a class name changing step of changing the class name of a specific class of said application program when as a result of said package name replacement step said specific class has the same class name as another class.

3. The program editing method according to claim 2, at said class name changing step, in order to change said class name of said specific class, a new class name is generated by using a character string that is employed for said package name of said package, before said package is changed at said package name replacement step, to which said specific class belongs.

4. The program editing method to claim 1, further comprising a step of:
changing class names in said application program, to unique class names that do mutually not overlap.

5. A single packaging system comprising:
input means for entering a Java program consisting of a plurality of classes;
package name replacement means for replacing, with a single package name, package names of packages to which said classes of said Java program entered by said input means belong;
name scope changing means for changing, to package scopes, name scopes of internal fields in said classes that are not to be referred to by sources outside said Java program; and
output means for outputting the obtained Java program through said package name replacement and said name scope change.

6. The single packaging system according to claim 5, further comprising:
digital signing means for digitally signing said program obtained through said package name replacement and said name scope change.

7. The single packaging system according to claim 5, further comprising:
name list preparation means for preparing a name list for said class names and said name scopes of said internal fields in said classes;
name collision avoiding means for examining said name list, prepared by said name list preparation means, to find class names that are the same as the result of the package name replacement performed by said package name replacement means, and for changing said same class names in said name list in order to avoid the overlapping of said class names; and
said name scope changing means refers to said name list to change said name scopes, and replaces class names with class names to avoid collision.

8. A Java program development system comprising:
package name replacement means for replacing, with a single package name, package names of packages to which classes that constitute said program belong;
name scope changing means for changing, to package scopes, name scopes of internal fields in said classes that are not to be referred to by sources outside said application program; and
digital signing means for digitally signing said program obtained through said package name replacement and said name scope changing.

9. The Java program development system according to claim 8, further comprising:
name list preparation means for preparing a name list for said class names and said name scopes of said internal fields in said classes;
name collision avoiding means for examining said name list, prepared by said name list preparation means, to find class names that are the same as the result of the package name replacement performed by said package name replacement means, and for changing said same class names in said name list in order to avoid the overlapping of class names; and
said name scope changing means refers to said name list to change said name scopes, and replaces class names with class names to avoid collision.

10. A principal information addition system for adding principal information to a program comprising:
input means for entering an application program that has as a concept a package that admits mutual data referring only to a specific visibility that is designated, and that consists of a plurality of classes that belong to predetermined packages;
package name replacement means, for replacing, with a single package name, package names of packages to which said classes of said application program entered by said input means belong;
data attribute change means, for changing an attribute of internal fields of said classes that are not referred to by sources outside of said application program, so as to permit an access for a reference in the same package; and
principal information addition means, for adding principal information for specifying a reference of an access requesting user to said application program obtained through said package name replacement and said data attribute change, and for obtaining an access authority based on said principal information; and
output means, for outputting said application program including said principal information.

11. The principal information addition system according to claim 10, wherein a digital signature is employed for said principal information.

12. An editing program, which permits a computer to edit said program that is written in an object oriented programming language, based on a concept of a package that admits mutual data referring only to a specific visibility that is designated, and that consists of a plurality of classes that belong to predetermined packages, comprising:
a package name replacement process, for replacing, with a single package name, package names of packages to which classes that constitute an application program belong; and
a data attribute change process, for changing an attribute of internal fields of said classes that are not referred to by sources outside said application program, so as to accept an access for a reference in the same package.

13. The editing program according to claim 12, further comprising:
a class name changing process for changing the class name of a specific class of said application program when as a result of said package name replacement process said specific class has the same class name as another class.

14. A storage medium on which input means of said computer stores a computer-readable program, which permits said computer to perform:
a process for replacing, with a single package name, package names of packages to which classes that constitute a Java application program belong; and
a process for changing, to package scopes, name scopes of internal fields in said classes that are not to be referred to by sources outside said Java application program.

15. The storage medium according to claim 14, wherein said computer-readable program permits said computer to further perform:

a class name changing process for changing the class name of a specific class of said application program when as a result of said package name replacement process said specific class has the same class name as another class.

16. A program transmission system comprising:

storage means for storing a program that permits a computer to perform
- a process for replacing, with a single package name, package names of packages to which classes that constitute a program belong, and
- a process for changing, to package scopes, name scopes of internal fields in said classes that are not to be referred to by sources outside said application program; and transmission means for reading said program from said storage means and transmitting said program.

17. The program transmission apparatus to claim 16, wherein said program permits said computer to further perform:

a class name changing process for changing the class name of a specific class of said application program when as a result of said package name replacement process said specific class has the same class name as another class.

* * * * *